United States Patent [19]

Huke

[11] 4,170,304

[45] Oct. 9, 1979

[54] WRAPPING FILM

[75] Inventor: Peter N. Huke, Burnham-on-Sea, England

[73] Assignee: British Cellophane Limited, Bridgewater, England

[21] Appl. No.: 907,508

[22] Filed: May 19, 1978

[30] Foreign Application Priority Data

May 26, 1977 [GB] United Kingdom ............... 22198/77

[51] Int. Cl.$^2$ ............................................. B65D 19/00
[52] U.S. Cl. .................................. 206/597; 156/195; 264/22; 264/171
[58] Field of Search ................. 264/22, 171; 156/195; 53/32, 211; 206/386, 45.33, 597

[56] References Cited

U.S. PATENT DOCUMENTS

| | | | |
|---|---|---|---|
| 2,569,540 | 10/1951 | Selby ............................. | 260/897 R |
| 2,810,933 | 10/1957 | Pierce et al. ....................... | 264/22 |
| 3,171,539 | 3/1965 | Holbrook et al. ................... | 264/22 |
| 3,343,969 | 9/1967 | Padgett et al. ..................... | 53/32 |
| 3,423,274 | 1/1969 | Lahm et al. ....................... | 428/409 |
| 3,501,363 | 3/1970 | Kirkpatrick ....................... | 428/174 |
| 3,821,332 | 6/1974 | Solop ............................. | 260/897 A |
| 3,986,611 | 10/1976 | Dreher ............................ | 206/45.33 |
| 4,087,505 | 5/1978 | Sugimoto et al. .................. | 264/95 |

FOREIGN PATENT DOCUMENTS 514687 11/1939 United Kingdom .
765834 1/1957 United Kingdom .
829309 3/1960 United Kingdom .

OTHER PUBLICATIONS

"Shrink & Stretch Equipment"—Modern Packaging Encyclopedia & Directory—Siegel, 12-1976, pp. 209, 210, 212 & 213.

"Stretch vs Shrink Film", Plastics & Rubber Weekly, Wolpert, 12-1976, p. 29.

*Primary Examiner*—Jeffery R. Thurlow
*Attorney, Agent, or Firm*—Watson, Cole, Grindle & Watson

[57] ABSTRACT

A wrapping film for use in spin wrapping applications is produced by extruding a blend of polyethylene with between 0.5 and 10% by weight of polyisobutylene to form a film and treating one surface of the film with a corona discharge.

5 Claims, No Drawings

WRAPPING FILM

This invention is concerned with wrapping film and in particular with wrapping film suitable for spin wrapping applications.

It is known to secure goods, for example boxes of merchandise, to a pallet by applying a continuous film strip in an overlapping helical-like relationship around the pallet and goods so that the pallet and goods are firmly secured within a tubular envelope. For this purpose, it is usual to rotate the pallet with goods on a turn-table and apply the film strip, about 400 millimeters in width first to the pallet and then to the goods from a reel which is at the same time moved vertically upwards. The reel may, if required, be then moved downwardly to apply a second layer of wrapping material over the first layer.

It is also known to employ a wrapping film for spin wrapping applications which contains a tackifying agent to ensure that the overlapping portions of film adhere to each other. However, such films are equally tacky on both sides and should wrapped loads in the course of handling come into contact with each other they stick together and on parting there is a tendency for the wrappings to be disturbed or even broken.

The present invention is concerned with a wrapping film suitable for spin wrapping applications in which one side of the film is tackier than the other side.

According to the present invention a method of manufacture of a wrapping film suitable for use in spin wrapping applications comprises extruding a blend of polyethylene with between 0.5 and 10% by weight of polyisobutylene to form a film and treating one surface of the film with a corona discharge.

It has been found that when wrapping film manufactured in accordance with the invention has been aged for a few days, it develops a tackiness on the corona treated side which is greater than the tackiness on the untreated side. Thus when such film, with the corona treated surface innermost, is spin wrapped about a pallet with goods, the film adheres firmly to itself in the overlapping portions of the helical-like turns. The outer surface, however, does not exhibit such a degree of tackiness to the extent that if two separate wrapped pallet loads should come into contact their tendency to stick together is low and damage to the wrappings is minimised.

When the polyisobutylene content of the blend exceeds about 10% by weight the tackiness of the film tends to become too excessive for practical handling in spin wrapping operations.

The polyisobutylene content in the polyethylene/polyisobutylene blend preferably lies in the range between 2 and 5% by weight and more preferably in the range between 3 and 4.5% by weight.

The corona discharge treatment is conveniently the conventional corona discharge surface treatment which is applied to polyethylene and other films to render the surfaces receptive to printing inks. Preferably, the treatment in accordance with the present invention is at such a level that the wetting tension of a surface of plain polyethylene film subjected to the same conditions would be at least 34 dynes per centimeter when measured by the method described in Standard No. D2578-67 of the American Society for Testing Materials (ASTM).

The polyethylene/polyisobutylene blend may be extruded through a slit die, solidified on a chill roll and exposed to a corona discharge on one surface. Alternatively the polyethylene/polyisobutylene blend may be extruded to form a tubular film by the so-called "bubble" process, collapsed between nip rollers to form a flattened tube and then treated on both surfaces with a corona discharge. The tubular film is then slit to form one or more flat films with one corona treated surface and one untreated surface and each film is separately wound into a roll.

The invention also includes wrapping film when manufactured in accordance with the method of the invention and a pallet of goods when wrapped with the wrapping material.

The invention will now be further described by way of the following Examples:

EXAMPLE 1

A blend of a low density polyethylene with 3.5% by weight of polyisobutylene was extruded through an annular die and converted into tubular film by the so-called "bubble" process having in a collapsed form, a width of 1.2 meters. The collapsed tube drawn away at a speed of 40 meters per minute was subjected on both sides, in succession, to a corona discharge applied between a single edge electrode and an earthed roller. Both edge electrodes were placed about 3 millimeters away from the earthed roller and were supplied with power from a 6 KVA generator operating on about two thirds power. The output current was about 8 amps. The level of treatment of the corona discharge had previously been checked by measuring the wetting tension of the surface of a low density polyethylene film subjected to the identical treatment. This was found to be 42 dynes per centimeter by the method of ASTM Standard D2578-67. Both edges of the collapsed film were slit to form two films, each of which were then slit to form three films, each 400 millimeters wide. All six films were separately wound on to a roll. Each film had a corona discharge treated surface and an untreated surface.

After a lapse of ten days sample strips of the film one inch in width were taken. Sample pairs of strips were pressed together, treated surface to treated surface, treated surface to untreated surface and untreated surface to untreated surface under the pressure of a roller 3 kilograms in weight. The degree of stick of one sample to the other was then measured as the weight required to shear the two samples apart. The results obtained were as follows:

Corona treated surface to corona treated surface (average of 10 samples)—1,382 grams/inch Corona treated surface to untreated surface (average of 10 samples)—1,288 grams/inch Untreated surface to untreated surface (average of 10 samples)—997 grams/inch When the film 400 millimeters wide was used to spin wrap a pallet loaded with goods contained in stacked cardboard boxes, the corona discharge treated surface innermost, it was found that excellent adhesion was obtained at the overlapping portions of the helical-like wrap firmly securing the pallet and the goods. When two such wrapped pallets were brought into contact it was found that they could easily be parted without any rupture or other damage to the wrappings or either palletted load.

EXAMPLE 2

A blend of a low density polyethylene with 3.1% by weight of polyisobutylene was extruded through an annular die and converted into a tubular film having a wall thickness of about 25 microns and in a collapsed form a width of 0.86 meter. The collapsed tube was drawn away at a speed of 24 meters per minute and was subjected on both sides to a corona discharge applied between a single edge electrode and an earthed roller. Both edge electrodes were set at a distance of 3.5 millimeters from the earthed roller and were supplied with power from a 3 KVA generator. The output current was 0.75 amps. The level of treatment of the corona discharge was checked, as in Example 1, by measuring the wetting tension on plain treated low density polyethylene film and was found to be 38 dynes per centimeter.

Both edges of the collapsed film were slit to form two films and each film was slit longitudinally to form two films, each 400 millimeters wide. Each of the four films were separately wound into a roll. Each film had a corona discharge treated surface and an untreated surface.

After a lapse of 30 days sample strips of the film one inch in width were taken and the degree of stick of one sample to another, treated side to treated side and untreated side to untreated side were measured by the method described in Example 1.

The results were as follows:

Corona treated surface to corona treated surface (average of 10 samples) —1,483 grams/inch.

Untreated surface to untreated surface (average of 10 samples) —743 grams/inch.

EXAMPLE 3

The procedure of Example 2 was repeated except that the blend consisted of low density polyethylene with 4.5% by weight of polyisobutylene.

The results obtained were as follows:

Corona treated surface to corona treated surface (average of 10 samples) —1,087 grams/inch (the film failed before the seal).

Untreated surface to untreated surface (average of 10 samples) —510 grams/inch.

We claim:

1. A method of manufacture of a wrapping film suitable for use in spin wrapping applications comprising extruding a blend of polyethylene with between 0.5 and 10% by weight of a tackifying agent polyisobutylene to form a film and treating one surface of the film with a corona discharge to increase the adhesive characteristics thereof, the level of treatment of the film by corona discharge is not less than the level of treatment required to bring the wetting tension of plain polyethylene film to at least 34 dynes per centimeter.

2. A method according to claim 1 in which the polyisobutylene content in the blend lies in the range between 2 and 5% by weight.

3. A method according to claim 1 in which the polyisobutylene content in the blend lies in the range between 3 and 4.5% by weight.

4. A wrapping film when manufactured by a method according to claim 1, claim 2 or claim 3.

5. A pallet of goods when wrapped with wrapping film according to claim 4.

* * * * *